United States Patent [19]
Ferrante

[11] 3,885,075
[45] May 20, 1975

[54] COMPOSITE SLATE STRUCTURE

[75] Inventor: Elmer A. Ferrante, Easton, Pa.

[73] Assignees: Elmer A. Ferrante; Frank LaBarba, both of Easton; Alexander D. Ricci, Huntingdon Valley, all of Pa. ; part interest to each.

[22] Filed: Oct. 1, 1973

[21] Appl. No.: 402,271

[52] U.S. Cl. .................... 428/150; 52/309; 52/315; 428/446
[51] Int. Cl. ........................... E04c 1/40; B32b 3/00
[58] Field of Search ...... 52/309, 315; 161/162, 168, 161/247, 249, 270, 43, 146

[56] References Cited
UNITED STATES PATENTS

| | | | |
|---|---|---|---|
| 2,047,648 | 7/1936 | Pollard.................................. | 52/315 |
| 3,562,076 | 2/1971 | Lea.................................. | 161/168 X |
| 3,621,635 | 11/1971 | DeLange............................ | 52/315 X |
| 3,649,424 | 3/1972 | Rhiando............................. | 52/315 X |
| 3,719,011 | 3/1973 | DeLange............................ | 52/315 X |

OTHER PUBLICATIONS

Kessler, D. W., and Sligh, W. H., "Physical Properties and Weathering Characteristics of Slate," U.S. Bureau of Standards Journal of Research Vol. 9, pp. 377–382.

Primary Examiner—George F. Lesmes
Assistant Examiner—Alan T. McDonald
Attorney, Agent, or Firm—Alexander D. Ricci

[57] ABSTRACT

The present invention is directed to a composite slate structure produced primarily from waste slate chips. The structure comprises a support member having slate chips adhered to one of its outer surfaces. The structure is most suitable as a roofing material because of its decorative appearance as well as its weather resistance and durability.

7 Claims, 3 Drawing Figures

COMPOSITE SLATE STRUCTURE

BACKGROUND OF THE INVENTION

The fact that slate has found successful use as a building material, and in particular roofing material as well as for decorative purposes, needs little discussion.

The basic reason for its once widespread use as a roofing material is that the slate is basically a layered material, or stone which could be processed to produce a thin shingle suitable for use as a primary roofing material.

Most roofing contractors will attest to the fact that slate not only provides roofs which are aesthetically desirable, but roofs which possess ultimate durability under even the most severe weather conditions.

However because amount of slate available has dwindled, and because costs of processing the slate to produce shingles has increased significantly as well as the labor costs for installation, slate currently is seldom used for roofing and accordingly has been replaced by less effective but less costly roofing materials such as asphalt shingles.

Although slate production for roofing purposes has declined over the years, slate is still being used in large quantities for decorative purposes, and in particular in the decorative furniture area.

A byproduct of past and current slate processing is what is referred to as waste slate chips. At present there are millions of tons of waste slate chips piled in northeastern Pennsylvania. As is evident, these waste slate piles are not only eye sores, but cause a pollution problem because of the wash off of the smaller particles during rains.

Unlike other waste stones, e.g., limestone, mica, granite, quartz, silica, etc., waste slate cannot be practically pulverized or crushed for utilization as aggregates for devorative uses, construction and primarily concrete utilization, or decorative garden materials. The composition of slate is such that it is very durable and abrasive, thereby causing great wear on the pulverizing or aggregate producing machinery. In addition since the structure of slate is layered, the resulting particles or aggregates from the pulveriding or crushing operation are not that attractive nd/or and/or as additives.

Because of the foregoing then, the amount of waste slate chips has been substantial, and in fact has been increasing steadily, thereby creating not only undesirable aesthetics, impractical land usage, pollutional problems, but also disposal problems. Accordingly it was the present inventor's goal, to discover a way(s) of utilizing the waste slate chips to thereby not only eliminate or alleviate the problems caused but to convert a previously considered waste into a material having definite practical and commercial value.

GENERAL DESCRIPTION OF THE INVENTION

With the above described objective in mind, the present inventor discovered that most desirable and useful structures could be produced from the waste slate relatively inexpensively and with relatively simple equipment.

The inventive concept included aesthetic panelling for internal use for construction purposes, together with panelling structures for external and more specifically for roofing purposes. As can be appreciated, structural panelling for exterior use or as a substitute for current roofing materials must possess pre-requisites which are not necessarily required for internal structural materials.

Conditions in the interior of a structure are for the most part quite consistent. Although there are perhaps changes in ambient conditions from one season to another in certain areas, the changes for all practical purposes are gradual and consistent. On the other hand rather abrupt changes occur externally due of course to the change in weather conditions.

Because of the varying weather conditions, structural materials for exterior use must be specifically designed and manufactured.

These materials must not possess the pre-requisite strength and characteristics to perform the desired function, but must also be so fabricated to resist, for example the destructive sun rays and the warping and cracking which accompanies the constant and sometimes abrupt changes of temperature which can occur for example on a daily basis. These conditions together with changing humidity and moisture conditions, and in some areas, continual rain, place some rather stringent pre-requisites on the worker in the art who is attempting to design, formulate and construct new exterior building materials.

As earlier stated, slate because of its particular characteristics is considered the ultimate material in producing roofing shingles. The slate's sun resistance, durability, general wear resistance and ease of handling are not easily duplicated using either synthetic or natural materials.

The present inventor discovered that a structural article could be produced which not only made use of otherwise waste slate chips, but which also incorporated the inherent weather and sun resistance, durability and decorative characteristics of the slate.

Basically the structure comprises a support member which has adhered to one of its outer surfaces waste slate chips which have an average surface area of from about 1 to about 100 square millimeters. For decorative purposes as well as for utility (roofing) purposes, it is desirable that at least 60% and preferably from 75 to 98% of the total surface area of the support member be covered with the exposed flat surface of the slate chips. It would be most desirable to have the entire surface (100%) covered by the slate chips but this is seldom achieved.

The support member may be any solid material which should but although not necessary have some flexibility to permit easy installation. Flexibility allows for conformity and attachment to surfaces which are not completely level or vertical.

Supports such as normal wood, plywood, clipboard, hardboard, blockboard, asbestos board, laminates, semi-rigid plaster foams and plaster sheet material can be used quite satisfactorily.

The support member should be of such strength and thickness to allow installation of the ultimate structure with minimum labor and equipment requirements. As is obvious because slate is heavy, and the adhesive provides additional weight, the choice and thickness of the support structure should be made after consideration of the ultimate weight of the finished product and the intended use of such.

If the finished product, for example is to be utilized as decorative panelling for interior applications, the support member need not have the same thickness or characteristics as the finished product when used as a roofing material. Since the stresses, and the strength would normally be different, it might be appropriate for example to use thin wood as the support for internal panelling. This would avoid for example the possibility of "pull away" of the fibers of plywood. However plywood is a most desirable support for roofing where the weight and stresses caused by the slate cover is more evenly distributed. For the latter purpose, plywood having thickness of one-eighth inch to three-quarter inch has been quite satisfactory. The exterior plywood, i.e., those which have been pretreated to provide weather resistance provide excellent supports for the ultimate structure which will be used for exterior, and principally roofing purposes.

The support may also be chemically pretreated or mechanically treated (sand papered or abraded) to ensure proper, longer and complete adhesion of the resinous adhesive to the support surface.

The adhesive which in some cases is resinous may be one of many. This term is intended to include any composition which is organic or inorganic in nature which may be applied preferably as a fluid, and which subsequently irreversibly sets and hardens.

Materials for the purpose may be generally categorized as thermosetting resins, or similar resins which can be catalyzed to produce hardened resins, and the like.

Because of ease of handling, application and weight considerations, the resinous adhesives are preferred. For exterior use it is desirable to utilize as additives in the adhesive ultraviolet light absorbers and the like.

Although the finished product should ideally have a surface covered to the greatest extent possible with the surface of the slate chips however since this is not accomplishable to 100%, the adhesive utilized is directly exposed to weathering. Accordingly, the resin, should be formulated to be as weather resistant as possible. It should have, in the cured state, a coefficient of thermal expansion such to permit it to serve the function not only during the heat of the day but also during the cool of the evening and of course in the transitory temperature period. The resin must have the capacity to withstand not only the effects of direct sunlight but also the high temperatures which are encountered during the hot spells. These temperatures at roof level can reach 175°F on occasion. Of equal importance, is the resin's cold temperature properties. Preferably the resin should not become brittle under the low temperature conditions since obviously any cracking could effect its weathering and adhesive capacity. In addition without this capacity, cold temperature installation might prove problematic for roofing purposes since nails must necessarily be driven through the structure to attach such to the supporting beams or studs. Many resins can be used for this purpose, of which may be mentioned, phenolic resins, epoxy resins, polyester resins, acrylics, the alkyd resins and the like.

The resinous adhesives can be blended using the inherent properties of the resin coupled with any additional properties which may be added by including ingredients for the purpose. Most of the resins contemplated for use are to some degree or another flame and fire resistant. However these properties may be enhanced by incorporating in the resinous adhesive a sufficient quantity of the appropriate additive. Fire resistance may be gained by either the above method or by the application of a separate coating or the impregnation of one or both sides of the support structure.

Acrylic based resins have properties which are particularly suited for the purpose of this invention. These resins include but of course are not limited to those which are prepared from acrylate, methyacrylate, and methyl methacrylate monomers which are liquid and curable by the use of peroxides such as benzoyl peroxide and/or heat. Similarly the polyester resins which are prepared by the polymerization of the polyhydric alcohol esters of unsaturated dibasic acids. Typical polyhydric alcohols are ethylene glycol, diethylene glycol, propylene glycol, glycerine erythritol, sorbitol mannitol and the like. Typical unsaturated dibasic acids are maleic, fumaric and itaconic. Because of the functionality of this type resin, it is easily further modified by reaction and/or by addition of other polyesters which might add flexibility to the finally cured resin.

Such polyester resins as Paraplex P-13 of Rohm and Haas are quite suitable for this purpose. In addition such polyester resins as Dilipol 1B3 which are cured using cobalt naphthenate and cyclonox have been found to be quite suitable as has epoxy resins such as Epikote 828 which are amine cured. Alkyd resins which are preferred are those which are derived from a diol (ethylene or propylene glycol) and isophthalic or orthophthalic acid and having a viscosity of 60 to 800 centipoise and which can be catalyzed with lauryl or methyl ethyl ketone peroxide. To this basic resin may be added such ingredients as maleic anhydride and/or a terminally unsaturated monomer (e.g., styrene or methyl methylacrylate) in such amounts to provide the pre-requisite durability and flexibility.

The product is produced by the following steps:

A support e.g., 4 feet × 8 feet - ⅜ inch thick plywood is coated or impregnated on both sides with a low viscosity acrylic flame retardant resin. This resin not only furnishes the desired flame retarding properties, but also provides a protected support in that the support is rendered water and humidity resistant. In addition the initial impregnation provides a firm base to which the adhesive resinous material will tightly adhere.

A layer of the adhesive resinous material is then applied to one surface of the support in such thickness to provide an adequate body to provide for the following steps. Slate chips of the prescribed dimensions are then sprinkled on the surface of the adhesive. The chips are then pressed downward into the adhesive to assure greatest contact between the adhering surface of the chip and the resinous material. The pressing of the slate not only assures the necessary contact of the slate chips with the resin, but also aids in forcing any occluded air bubbles out of the resin to assure its homogenity, and accordingly its strength.

For maximum durability and weatherability, it is desirable to add a second and perhaps a third layer of the resin and slate chips to essentially build a layered slate chip structure. In some cases it may be desirable to add more layers. Obviously the layering assures maximum exposure of the slate chips. Most desirably the additional layers of resin and slate are applied to the previous layer prior to the final cure of the resin of the previous layer. This technique assures a uniform and unitary structure because of the bonding of the respective layers. The chips in the last or exposed layer should be applied so as to assure that the pre-requisite area of the final structure is covered by exposed slate chips.

The layering technique should desirably be utilized in producing the structure when such is to be utilized for roofing purposes. For interior decorative purposes a single layer of adhesive and slate chips is often only required.

The inventive structures particularly when used for roofing purposes not only provides the pre-requisite durability and weatherability but also provide for the elimination of various steps, and accordingly labor costs, normally required during the installation of a roof.

When a roof is being constructed on a structure bearing the appropriate studs or support beams, a plywood base is first generally nailed to the studs to completely enclose the structure. Tar paper is then placed and affixed to the plywood base, and finally shingles are nailed over and through the tar paper and on to the plywood base.

Because of the nature of the inventive roofing structure only one step is required, namely, the nailing or affixing the structure to the studs. The inventive structure is complete in itself and therefore the labor cost savings in this regard is substantial since the inventive structure requires no supporting means other than the studs, and no tar paper. The support member in this instance can be designed so as to provide for the engagement of several pieces of roofing structure either by appropriate notching, tongue and groove design, or angle cutting. The technique assures not only a unitary type roofing, but also for weather proof seams between the individual roofing structures. If desired these seams may be further sealed by utilization of a final resin coating and allowing such to cure.

DRAWINGS

Figure 1:
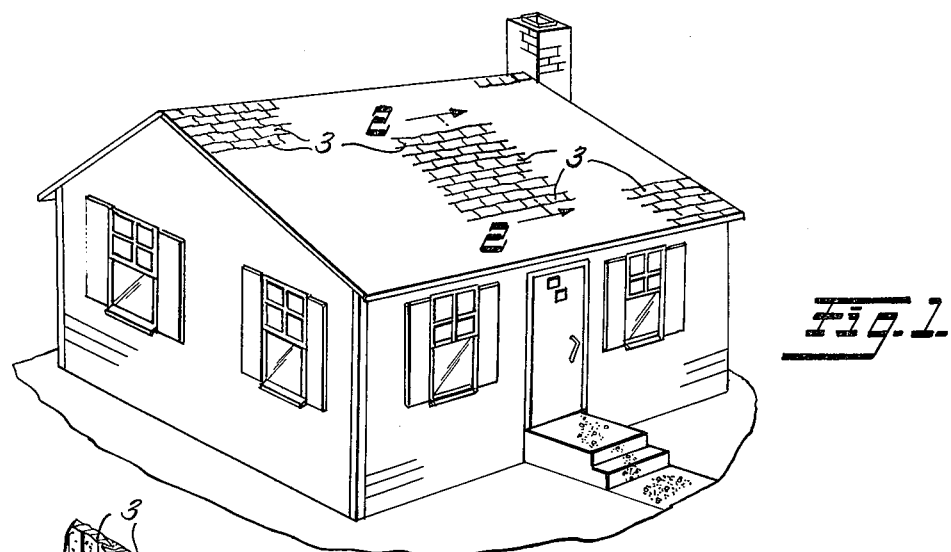
FIG. 1 is a perspective view of a dwelling embodying the roofing material of the invention.
Figure 2:
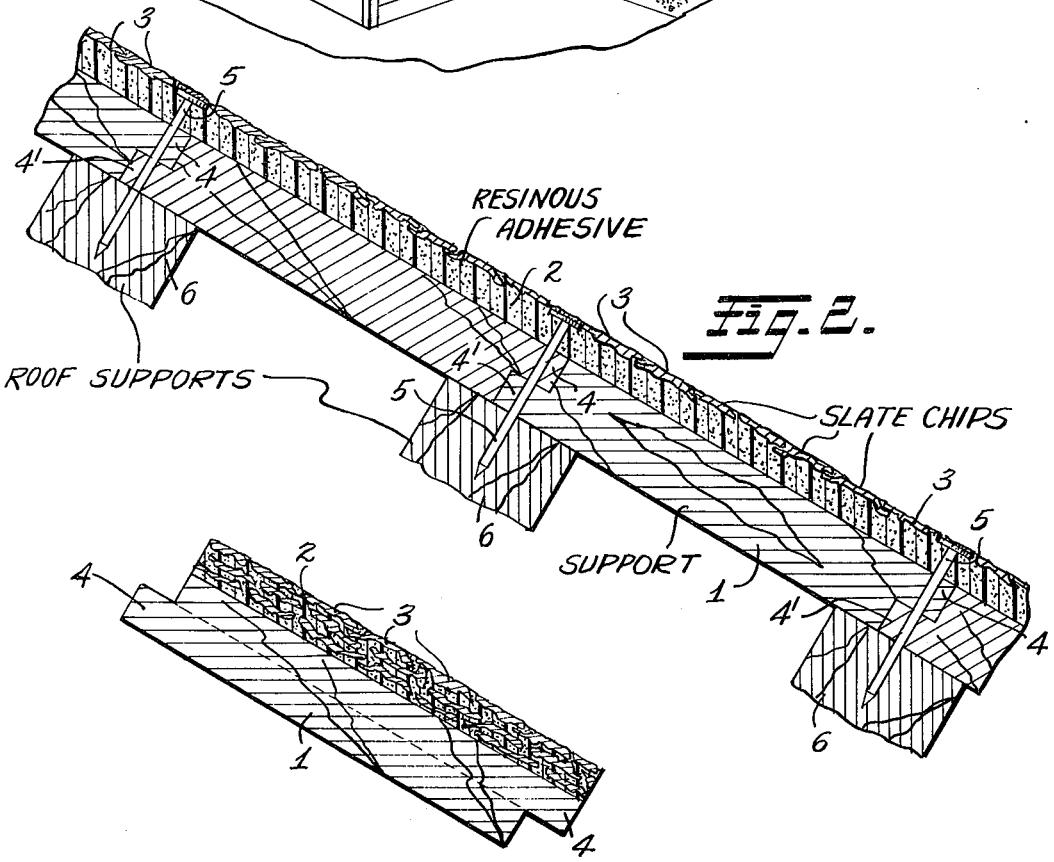
FIG. 2 is an enlarged fragmentary vertical sectional view, taken substantially on plane 2—2 of FIG. 1.
Figure 3:
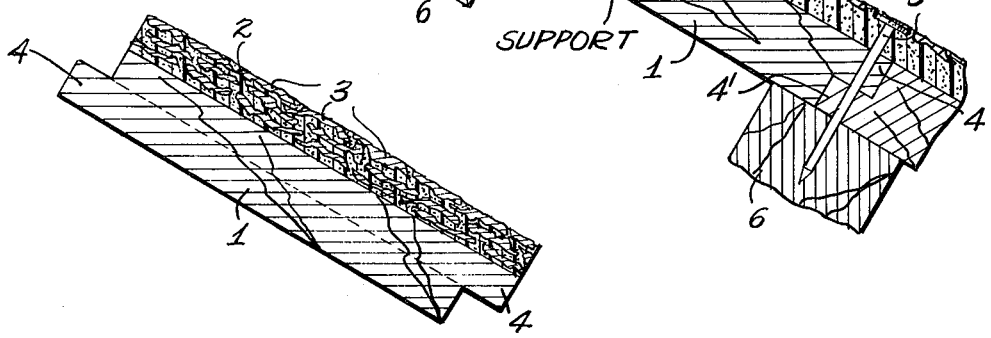
FIG. 3 is a sectional view of a modified form of roofing material.

In FIG. 2, support member 1 is coated with resinous adhesive 2 which when cured uniformly and permanently bonds slate chips 3 to support member 1. Interlocking means 4 and 4$^1$ permit the respective sections to engage so as to provide a continuous structure which can be conveniently affixed by for example nails 5 to support structures such as roof studding 6. FIG. 3 depicts a sectional view of the structure which contains various layers of adhesive 2 and slate chips 3. This structure is preferred where ultimate weather resistance is desired. The overlapping of the slate chips as depicted in FIGS. 2 and 3, actually provides the desired weather resistance.

In order to establish the overall characteristics of the inventive structure as a roofing material, several roofing panels were made using the three layer technique earlier described and depicted in FIG. 3. However in order to assess some of the weathering characteristics it was necessary to produce the three layered structure without a support which in itself is a modification of the preferred invention. An epoxyamine cured resin (Epikote 828) was used as the adhesive. Basically the resin was applied to a support which contained a release agent and the three layer technique used. Test samples were then produced from the cured resin slate layered system. The tests to which the samples were subjected and the results thereof are as follows:

Sample A: Surface 85% covered with finely-ground slate chips of about 4 mm in length (some fines) and 1 to 8 mm thick Sample B: Surface 85% covered with ground slate chips up to 8 mm in length (some fines) and 1 to 8 mm thick Sample C: Surface 85% covered with coursely-ground slate up to 20 mm in length (some fines) and 1 to 8 mm thick All samples were examined for uniformity of covering power, bearing in mind that these initial samples were hand-crafted and that any lack of uniformity could be controlled during actual production runs.

All three samples were
a. exposed to weather for 14 days duration
b. dried in oven for 2 hours at 178°F
c. immersed in water for 30 minutes
d. tested for water-fastness during several hard rain storms
e. checked for flexure
f. checked for pliability
g. checked for absorption
h. checked for acid resistance with 1% $H_2SO_4$ solution.

Observations were as follows:

1. Sample A passed the 90° pliability test for asphalt roofing and siding after 30 minutes immersion in water. (this is part of ASTM D228)

2. Samples B and C were too rigid for pliability testing. Ability to be bent 90° without surface rupture could be improved by
a. increase in number of fine particles
b. increase in % of epoxy used for bonding.

3. Samples A, B, and C all passed the loss of behavior in heating test for asphalt roofing and siding (ASTM D228). There was no loss of volatile matter, no change in appearance, and no blistering.

4. Sample A was too flexible for testing against cementasbestos roofing shingles and siding. (ASTM C222 and C223). Samples B and C both passed flexure test (more than 27 psi), deflection test (greater than 0.15 mm) and absorption test (less than 25.0%).

5. Could not test against ASTM 629 for structural slate or C406 for roofing slate because of the different nature of the product, the use of paper backing which is attached by acid, and the fact that these standards exclude products made from pulverized slate particles. However, a modification of ASTM C217 (Weather Resistance of Natural Slate) proved that these samples would withstand exposure to 1% sulfuric acid. (neither asphalt nor asbestos-cement samples would)

6. All samples appeared to be weather-fast on exposure to rainstorms.

7. An unusual feature exhibited itself on prolonged weather exposure: under direct rays of the sun, the binder took on a more glassy appearance which reflected light in an interesting pattern, particularly in Sample C.

CONCLUSIONS

Sample C showed the greatest potential for diversified use (roofing, column covers, spandrels, trim, etc.)

Tests were conducted by an independent slate producers guild in their laboratories.

We claim:

1. A roofing material comprising a solid support of such thickness that it is not rigid, a first layer of a substantially weather resistant, crack resistant, non-rigid cured resinous adhesive adhering a first layer of individual slate chips of at least one to about 100 square millimeters in area to a surface of said support, so as to cover at least 60% of said surface, a second layer of said cured resinous adhesive adhering a second layer of individual slate chips of at least one to about one hundred square millimeters in area to said first layer and covering at least 60% of said first layer of said chips, and a third layer of said cured resinous adhesive adhering a third layer of individual slate chips of at least one to about one hundred square millimeters in area to said second layer and covering at least 60% of said second layer of said chips.

2. A roofing material according to claim 1 which comprises at least one additional layer of each of the cured resinous adhesive and the slate chips.

3. A roofing material according to claim 1 wherein the last layer of chips account for 75 to 98% of the surface of the material.

4. A roofing material according to claim 1 wherein the area of the slate chips is from about 1 to about 20 square millimeters.

5. A structure according to claim 1 wherein the support is coated with a flame retardant.

6. A structure according to claim 1 wherein the support is plywood.

7. A structure according to claim 6 wherein the plywood is coated with a flame retardant.

* * * * *